United States Patent [19]
Odagiri et al.

[11] Patent Number: 6,147,836
[45] Date of Patent: Nov. 14, 2000

[54] TAPE CASSETTE HAVING VISIBLE DISPLAY OF REMAINING TAPE

[75] Inventors: Hirokazu Odagiri, Miyagi; Kenichi Hirose, Kanagawa, both of Japan

[73] Assignee: Sony Corporation, Tokyo, Japan

[21] Appl. No.: 09/154,769

[22] Filed: Sep. 17, 1998

[30] Foreign Application Priority Data

Sep. 19, 1997 [JP] Japan .................................. 9-273550

[51] Int. Cl.$^7$ ...................................................... G11B 23/02
[52] U.S. Cl. ............................................ 360/132; 242/347
[58] Field of Search ........................... 360/132; 242/341, 242/344, 347

[56] References Cited

U.S. PATENT DOCUMENTS

| | | | |
|---|---|---|---|
| 4,650,601 | 3/1987 | Brunner et al. .................... | 252/301.35 |
| 4,846,419 | 7/1989 | Tateno et al. ........................... | 242/71.8 |
| 5,255,143 | 10/1993 | Wolf .......................................... | 360/132 |
| 5,319,475 | 6/1994 | Kay et al. .................................... | 359/2 |
| 5,370,332 | 12/1994 | Goff et al. ............................... | 242/344 |

FOREIGN PATENT DOCUMENTS 11-96729   4/1999   Japan .

*Primary Examiner*—Jefferson Evans
*Attorney, Agent, or Firm*—Ronald P. Kananen; Rader, Fishman & Grauer

[57] ABSTRACT

A tape cassette having such a structure that a pattern is printed on a surface of a transparent or semi-transparent cassette housing, a scale display portion which becomes a yardstick for a remaining volume for a tape is formed on the lowest layer of this pattern printing portion and this scale display portion can penetratingly be seen from a surface of an opposite side of the cassette housing.

9 Claims, 7 Drawing Sheets

TAPE CASSETTE HAVING VISIBLE DISPLAY OF REMAINING TAPE

BACKGROUND

1. Field of the Invention

The present invention relates to a tape cassette and particularly to a display structure of a scale which serves as a yardstick for a remaining amount in the tape cassette.

2. Background of the Invention

A tape cassette is currently in wide use for various services and particularly, an audio compact cassette has a great many users from an installation-type recording reproduction apparatus to a portable reproduction apparatus.

As this audio compact cassette is easily manipulated, there are many users who individually enjoy themselves by recording a piece of music from a CD (compact disk) and hence, on sale are cassettes which have various recording minutes in matched to the recording time of the CD, However, it is not always possible to prepare a cassette corresponding to the recording time, thereby giving rise to a need to accurately grasp or know a remaining volume (remaining recordable time) of the tape in a case of continuously recording from a previously recorded portion.

Accordingly, a cassette with a scale as a yardstick for the remaining volume of the tape attached to a cassette housing has widely been executed. That is, this tape cassette is such that scales of 0, 50, 100 and the like at an equal distance are displayed on a transparent or semi-transparent cassette housing, thereby making it possible to roughly grasp the remaining recordable time of the tape with the scale as the yardstick by ascertaining a wound up diameter of the tape.

Some conventional scales are integrally projectingly formed on a surface of the cassette housing by a stamp carved on a metal die, but in this case, it is impossible to change the scale corresponding to kinds of the recording minute numeral value, and hence, with the same scale being in place, whereby it has been difficult to accurately grasp the remaining recordable time of the tape.

Then, as a replacement for this, if the scale is displayed on the surface of the cassette housing by way of printing, the scale in matched to the kinds of minute numeral values of the recording can be formed easily.

However, with the tape cassette wherein the scale is displayed by the printing like this, there is a fear that the scale becomes indiscernible when its surface is attached with scratches or a stain.

That is, in case of a cassette deck which is used in an environment having a large vibration like, for example, a car stereo and the like, as the cassette is comparatively secured firm to surely receive or transmit a signal between a head and a tape, the printed surface is attached with scratches and a stain by fixing tool upon the cassette being loaded or ejected and as a result, there has been a fear that the scale becomes indiscernible and a function of displaying the remaining volume of the tape is lost.

In order to avoid this, a method is conceivable to print the scale from an inside of the cassette housing, but in this case, the printing by using a specifically shaped pad (tampo) becomes necessary, so that not only an installation becomes complex but also costs are increased.

SUMMARY OF THE INVENTION

The present invention is implemented with a view to solving the above-mentioned problems and its object is to provide a tape cassette wherein the scale display serving as a yardstick for a tape remaining amount is not damaged with the scratches and the stain as well as which is inexpensively executed with comparative easiness at low cost.

In order to achieve the above-mentioned object, a tape cassette according to the present invention has such a structure that a picture or pattern is printed on a transparent or semi-transparent surface of a cassette housing, and a scale display portion as a yardstick for a remaining volume of a tape is formed on a lowest layer of a pattern printing portion so that this scale display portion can penetratingly be seen from a surface on an opposite side of the cassette housing.

In the tape cassette according to the present invention, arranged as mentioned above, since there is provided such a structure that the scale display portion is covered with the pattern of an upper layer for protection, the scale never becomes indiscernible even when the surface of the pattern is attached with scratches and a stain. Further, as the printing of the pattern on the tape cassette can be done by a general printing method, it can be carried out easily and inexpensively.

BRIEF DESCRIPTION OF THE DRAWINGS

FIG. 4 is a block diagram showing one example of an embodiment, according to the present invention, in which FIG. 4A shows the printing on an A surface side of the cassette housing, while

FIG. 8 is a diagram showing a modified example of the present invention, in which FIG. 8A is a diagram showing a state wherein the tape cassette is seen from the A surface side while

DESCRIPTION OF THE PREFERRED EMBODIMENTS

Hereafter, embodiments of the present invention will be explained with reference to the attached drawings.

Figure 1:
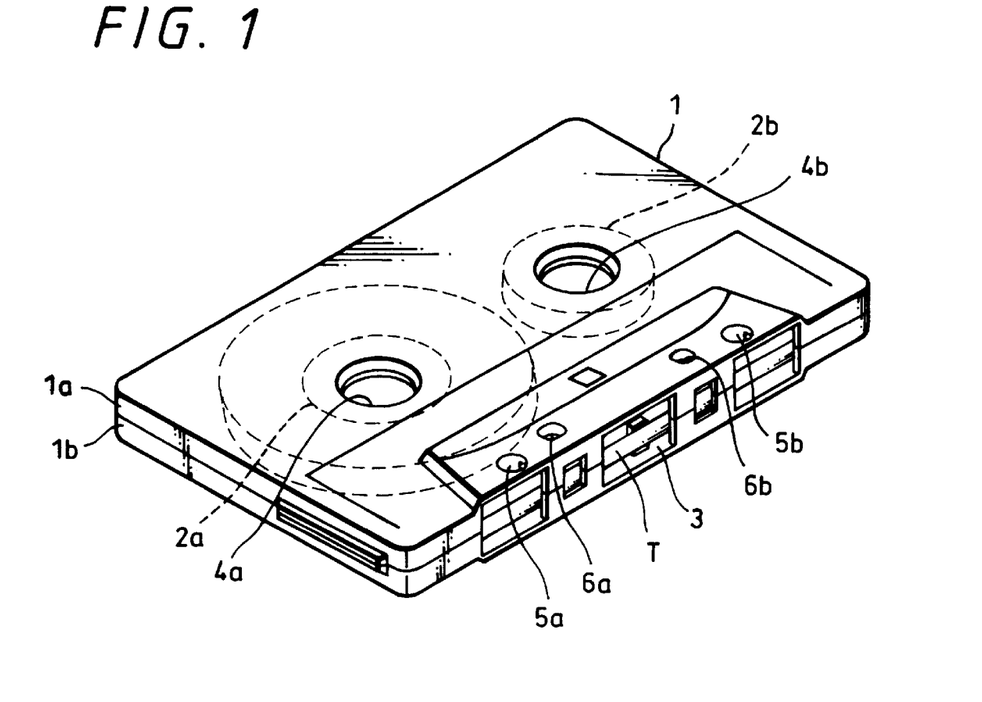
FIG. 1 is a perspective view of a tape cassette (audio compact cassette)

FIG. 1 shows an audio compact cassette as an example of a tape cassette. A cassette housing of a tape cassette 1 is comprised of a pair of upper and lower halves made up of plastic, for example, GPPS (general-purpose polyethylene), that is, an upper half 1a and a lower half 1b, which are united and fixed, and inside, a pair of left and right hubs 2a and 2b for winding up a tape (magnetic tape) T, as a recording medium are rotatably accommodated. The hub 2a is a supplying side hub and the hub 2b is a winding up or take-up side hub, that is, a tape running path is formed such that the tape T which is drawn out from the supplying side hub 2a passes through a front opening portion 3 of the cassette and is wound up by the winding up side hub 2b. Meanwhile, reference numerals 4a and 4b designate hub driving shaft apertures for hub driving axis, 5a and 5b capstan inserting apertures and 6a and 6b position reference apertures, respectively.

The tape cassette 1 is formed such that the cassette housing, that is, the upper half 1a and the lower half 1b are made up of transparent or semi-transparent plastic and the tape inside the tape cassette can be seen from outside.

Then, a picture or pattern of various design is printed on part of the surface of the cassette housing of the tape cassette 1. As for its printing method, there are methods which are generally known, such as pad (tampo) printing, offset printing, flexography, screen printing, thermal transfer printing and the like. Here, as one example thereof, the thermal transfer printing will be explained.

Figure 2:
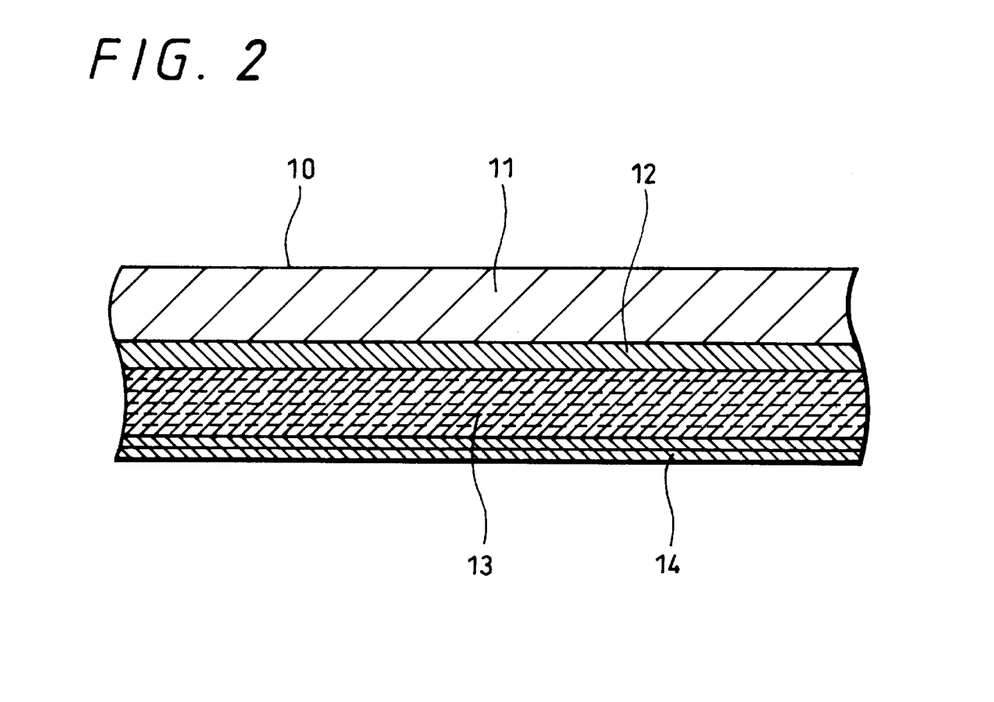
FIG. 2 is a cross-sectional view of a thermal transfer film used in thermal transfer printing.

FIG. 2 is a cross-sectional view of a thermal transfer film 10 to be used in the thermal printing.

This thermal transfer film 10 is formed of a stripping layer 12, a pattern layer 13 and an adherent layer 14 which are printed in turn in a superimposing fashion on one side surface of a base film 11. The printing of the respective layers is generally carried out by the gravure printing, the screen printing, the offset printing and the like.

The base film 11 can use any of a synthetical resinmade sheet such as polyethylene terephthalate, polypropylene or the like, various kinds of process paper and the like which are used as a base material sheet of the existent thermal transfer sheet. In this example, the polyethylene terephthalate is used. As for its thickness, 20~50 μm is generally supposed to be proper. Here, a 25 μm thick sheet is used.

The stripping layer 12 peels off from the base film 11 together with the pattern layer 13 and the layer thereunder due to heat and pressure which act at a time of transferring and further, has a function of protecting the transferred pattern layer 13 after the transferring, and is formed by printing an organic solvent or dispersion liquid out of materials in painted thickness of 0.1~5 μm, which have been well known in the past, such as acrylic system resin, vinyl chloride system resin, cellulose system resin, rubber system resin, urethane system resin, polyester system resin, vinyl acetate system resin, ethylene vinyl acetate system resin and the like.

The pattern layer 13 is what forms the pattern of various designs on an object material to be transferred, that is, the cassette housing, and is formed by printing the conventional well-known various inks in multi-layers, which are regulated after mixing various pigments or dying materials and the like with similar binder resin used to form the above-mentioned stripping layer 12.

The adherent layer 14 doesn't show adhesiveness in a normal condition but shows the adhesiveness when heated, and is what transfers the pattern layer 13 together with the stripping layer 12 on the surface of the object material to be transferred. As its materials, an organic solvent for various kinds of thermoplastic synthetic resin, for example, acrylic system resin has since been used and is coated and formed on the pattern layer 13 by the printing. Its thickness is generally 0. 3~3 μm, but when stronger adhesiveness is required, it is formed in two laminated layers as shown in FIG. 2.

Figure 3:
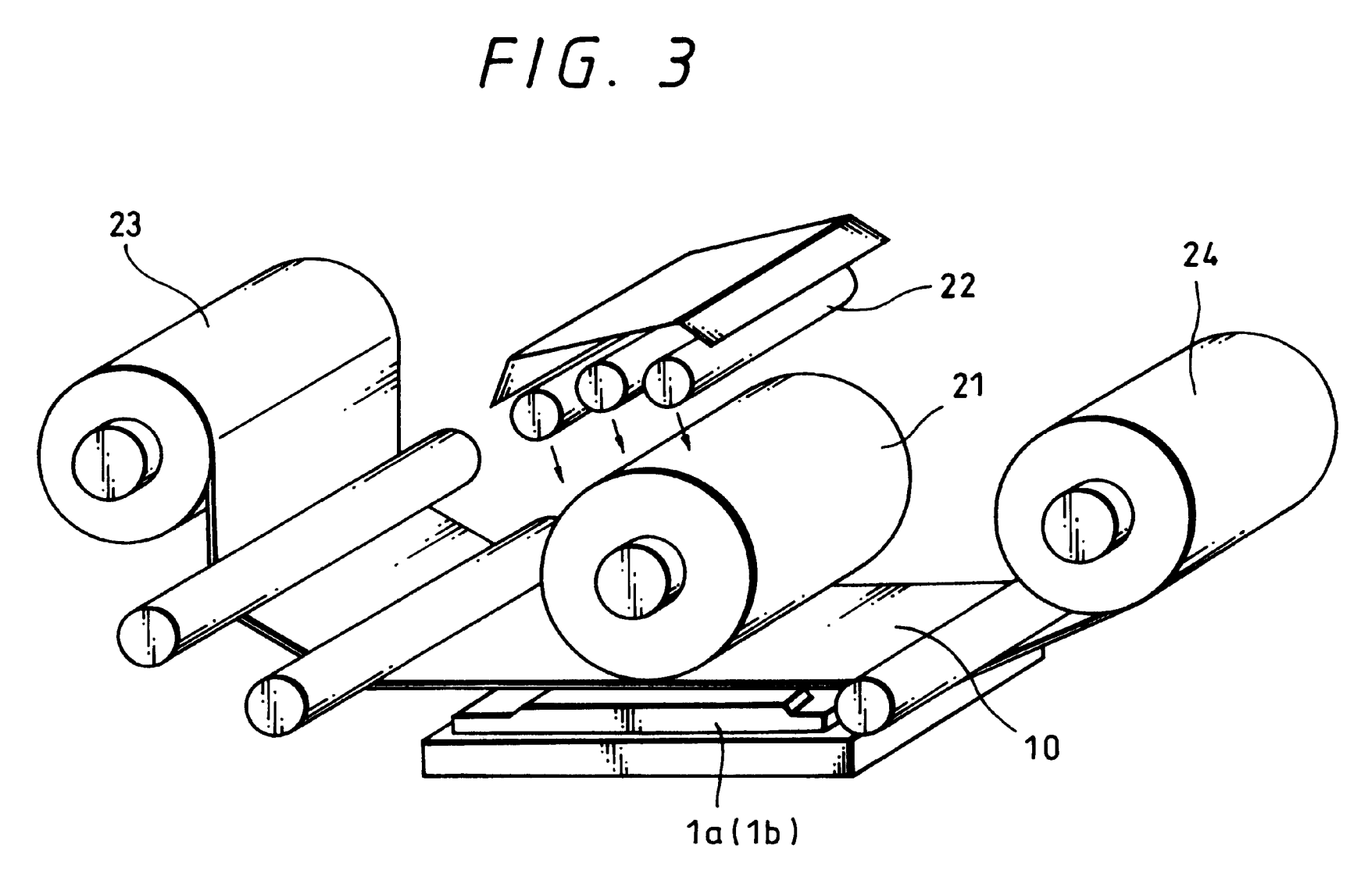
FIG. 3 is a perspective view used to explain the thermal transfer printing.

FIG. 3 shows an outline of the thermal transfer printing.

Here, a transfer roller 21 is made of silicon rubber, and heated up to about 200° C. by the heat from a heater 22. The thermal transfer film 10 is strung between a supply roller 23 and a wind-up or take-up roller 24 at tension of about 0.9 kgf with its adherent layer facing downward, under which the cassette housing (upper half 1a or lower half 1b) is disposed.

The thermal transfer printing by this thermal transfer apparatus is carried out in the following manner. First of all, the heated transfer roller 21 descends and when the thermal transfer film 10 is pressed on the cassette housing 1a with a pressure, the adherent layer 14 melts due to heat and pressure and tightly adheres to the cassette housing 1a. Then, when the thermal transfer film 10 is pulled upward, a part from the stripping layer 12 to the adherent layer 14 is transferred onto the cassette housing 1a. At that time, the stripping layer 12 which begins to peel off from the inside is divided into a side which remains on base film 11 from an stripping interface and a side transferred on the cassette housing 1a when the thermal transfer film 10 is peeled off upward. The transfer side protects the pattern layer 13.

FIGS. 4 to 7 show an example of each of suitable embodiments according to the present invention.

Figure 4A:
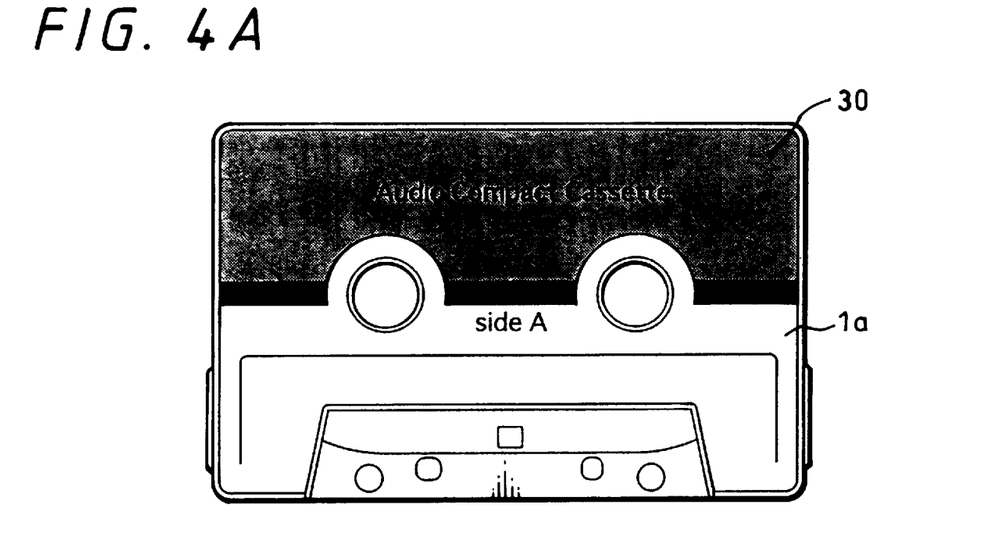
Figure 4B:
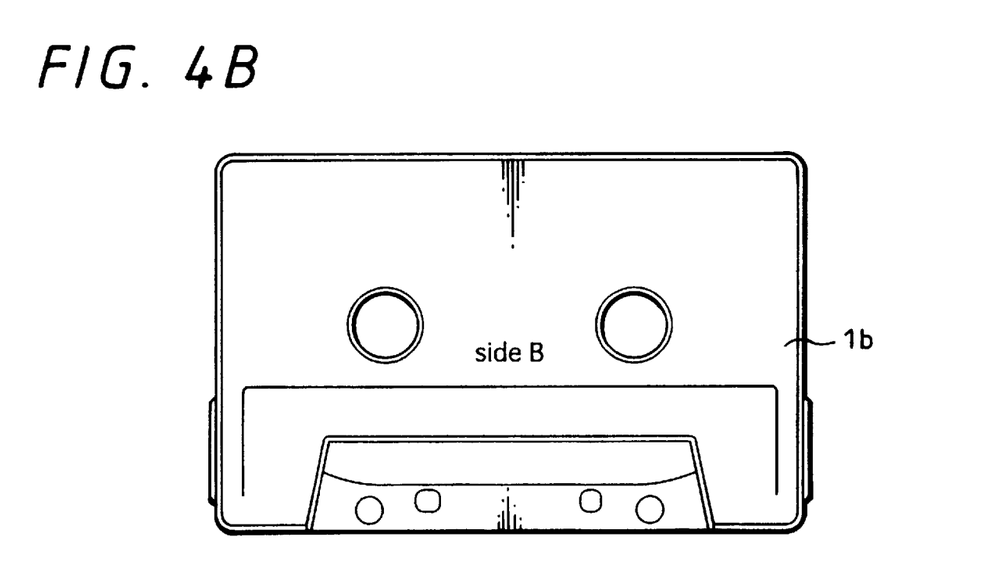
FIG. 4B shows the printing on a B surface side of the same.

FIG. 4A shows an example of the printing on the A surface side (a 1a side of the upper half) of the cassette housing and FIG. 4B shows an example of the printing on the B surface side (1b side of the lower half 1b). As shown in FIG. 4B, on the A surface side of the cassette housing, a pattern 30 is printed over a wide range together with letters [Audio Compact Cassette] and [side A]. On the other hand, as shown in FIG. 4B, only letters [side B] are printed on the B surface side of the cassette housing.

Figure 5:
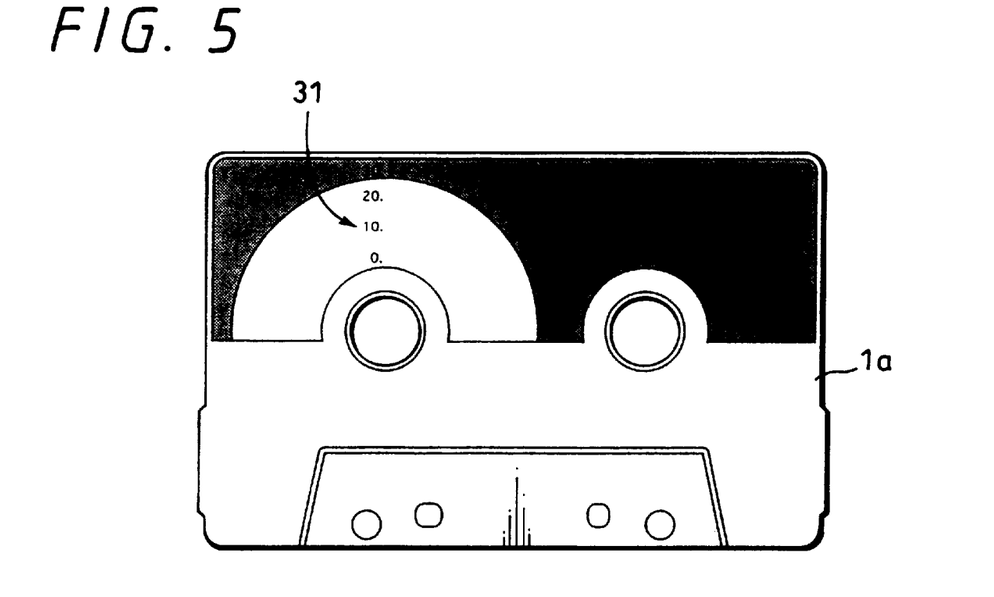
FIG. 5 is a diagram showing a state wherein the printing on the A surface side of the cassette housing is seen through from a rear side of the same.
Figure 6:
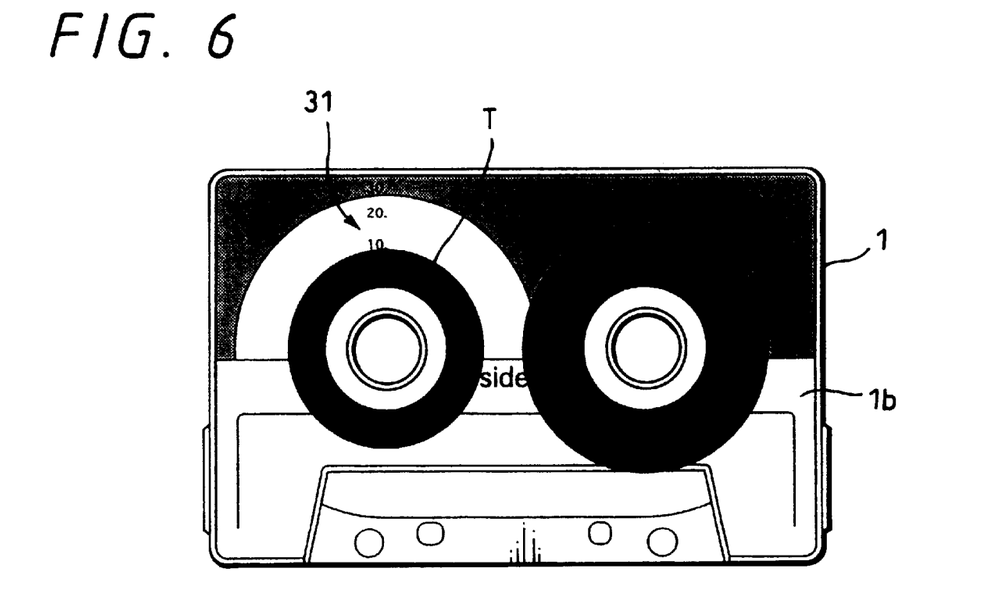
FIG. 6 is a diagram showing a state wherein the tape cassette is seen from the B surface side of the same cassette housing.

FIG. 5 shows a state in which the printing on the A surface side of the cassette housing is seen through from the rear surface side of the upper half 1a and FIG. 6 shows a state in which the tape cassette 1 is seen from the B surface side. On the other hand, FIG. 7 shows a cross-section of a pattern printing portion on the A surface side of the cassette housing.

Figure 7:
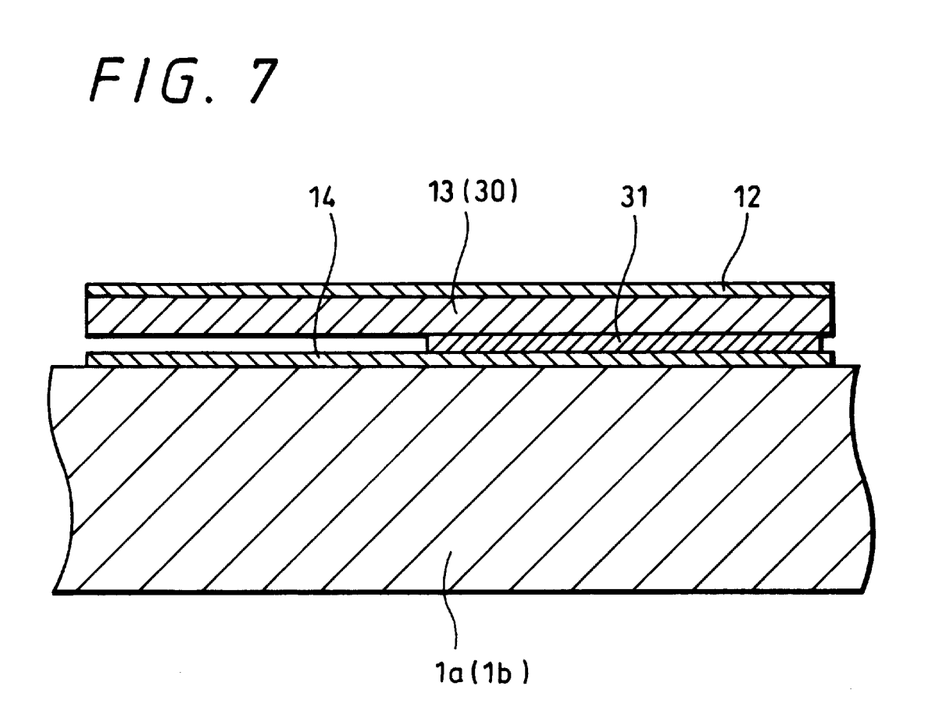
FIG. 7 is a cross-sectional diagram of a pattern printing portion on the A surface side of the same cassette housing.

As apparent from FIG. 7, in this example, the lowest layer of the pattern layer 13 (the printing portion of the pattern) which is transferred on the A surface of the cassette housing, that is, the upper half 1a is made to serve as a scale display portion 31. The scale display portion 31 is such that, for example, numerical values of minutes such as 0, 10, 20, 30 and a scale display in a dotted state and the like serving as a yardstick for a remaining volume of the tape as shown in FIG. 5 are arranged and displayed at a predetermined interval and are formed by the printing on a layer which comes in contact with the lowest layer of the pattern layer 13, that is, the upper half 1a as the substrate.

Viewing the printing portion of the pattern layer 30 on the upper half 1a in terms of a cross-sectional structure, the scale display portion 31 is printed through the adherent layer 14 on the surface of the upper half 1a and the pattern 30 is printed on an upper layer thereof. In this case, the scale display portion 31 is, at least, wholly covered with the pattern 30 and hence, the scale display portion 31 is invisible when the upper half 1a is seen from the front surface side, but when it is seen from a rear surface side, the scale display portion 31 can be seen through the transparent or the semi-transparent plastic shown in FIG. 5.

Accordingly, as shown in FIG. 6, when the tape cassette 1 is seen from the B surface side, the scale display portion 31 is visibly perceived as a background of the tape T which is wound on the hub, thereby making it possible to accurately perceive a remaining volume of the tape, that is, remaining recordable time by directly reading the display of the numerical value of the minute corresponding to a wound up diameter of the tape T (an example in FIG. 6 indicates a remaining volume of the tape on the B surface side is 10 minutes or so).

A position of the numerical value display of the minute of the scale display portion 31 is arranged by calculating the wound up diameter from a running length and a thickness of the tape and is scaled corresponding to every minute. Also, by using a metallic tone, white and bright colors on a portion (except for the numerical value display of minutes in the scale display portion 31), contrast with the tape becomes clear, making the remaining volume easy to see.

As mentioned above, the pattern 13 is printed on the upper layer of the scale display portion 31. As this pattern 13 has a painted thickness of several μm, the scale display portion 31 is so structured as to be protected by the painted thickness. Accordingly, for example, at a time when a tape cassette is put in and pulled out from a car stereo, even if a printed surface of the pattern of the cassette housing is attached with scratches and a stain, because the scale display portion 31 is protected by the pattern layer 13, the scale never becomes indiscernible, that is, its function of displaying the remaining volume is never damaged.

The stripping layer 12 of the thermal transfer film on the upper layer of the pattern layer 13 also works as a protection layer. The scale display portion 31 is covered with a layer which is the sum of the stripping layer 12 and the pattern layer 13, and hence, is protected with further certainty.

Also, in the above-mentioned structure, because entirely different patterns are arranged on the front surface side and the rear surface side of the cassette housing, that is, the upper half 1a, there is no need to be particular about a pattern with the scale as a base tone, and hence the design is not restricted. The above is not true in a conventional case where a scale has been printed on the front surface side.

Further, as the printing of the pattern on the tape cassette can be carried out by a general printing method like the thermal transfer printing, it can be executed easily and inexpensively.

FIG. 8 shows a modified example of the present invention.

Figure 8A:
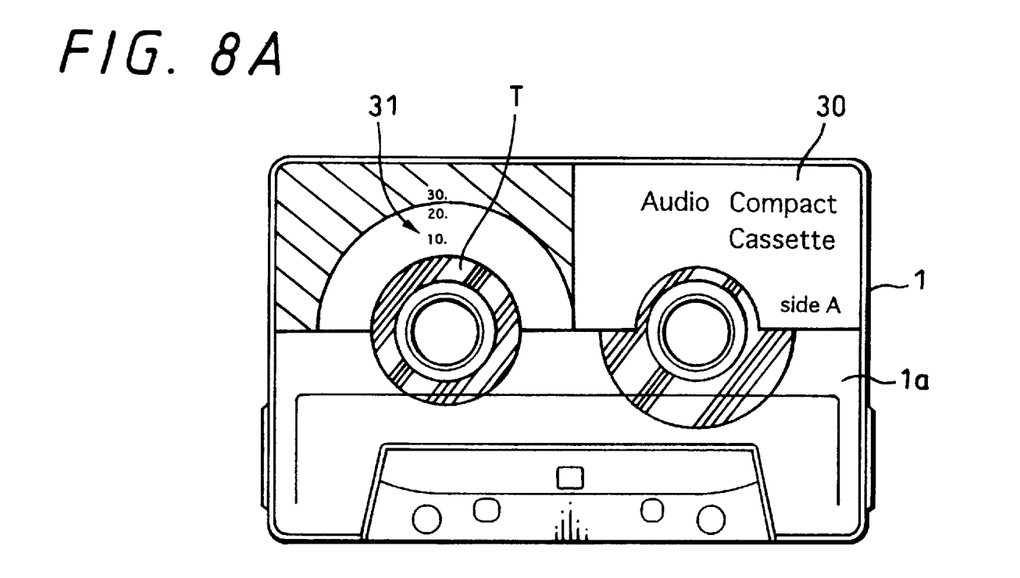
Figure 8B:
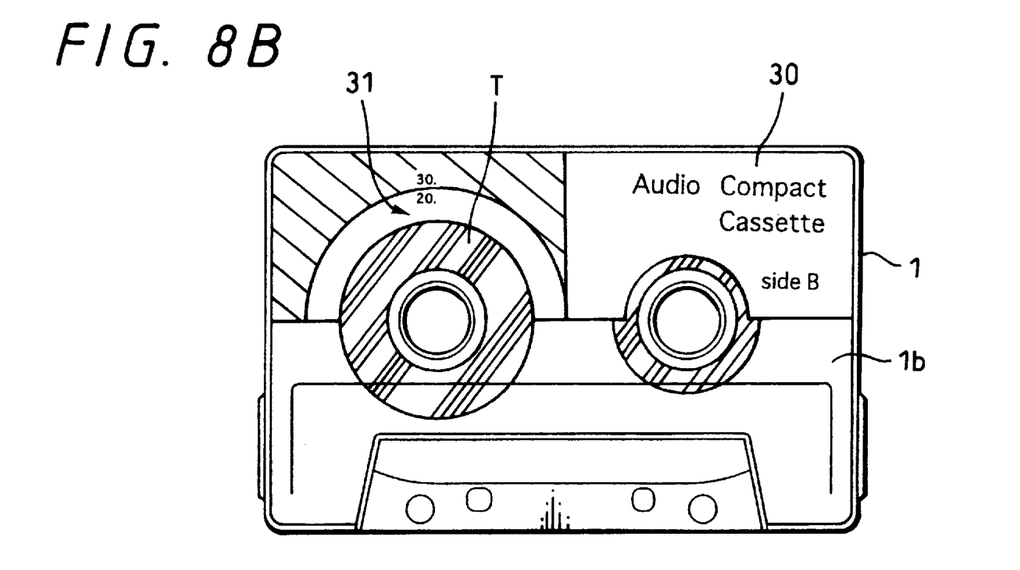
FIG. 8B shows a state wherein the tape cassette is seen from the B surface side.

FIG. 8A shows a state when the tape cassette 1 is seen from the A surface side and FIG. 8B shows a state when the tape cassette is seen from the B surface side, respectively. As apparent from FIGS. 8A and 8B, in this embodiment, the printing portion of the pattern 30 is formed on both the A surface side and the B surface side in a half divided range, thereby making the scale display portion 31 to be visible from both the A and B surface sides.

Figure 9:
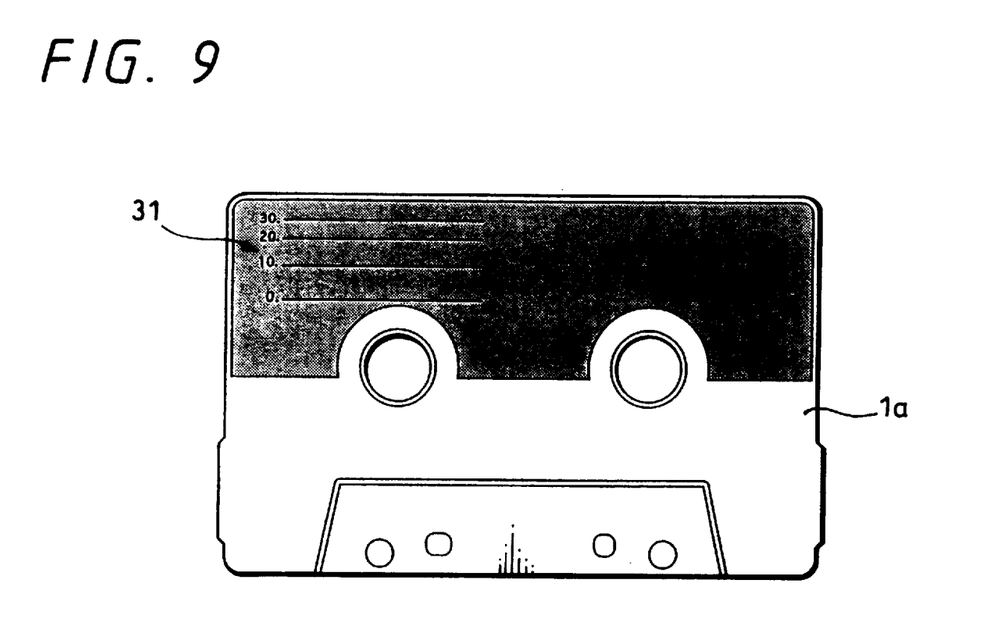
FIG. 9 is a diagram showing a modified example of the scale display portion.
Figure 10:
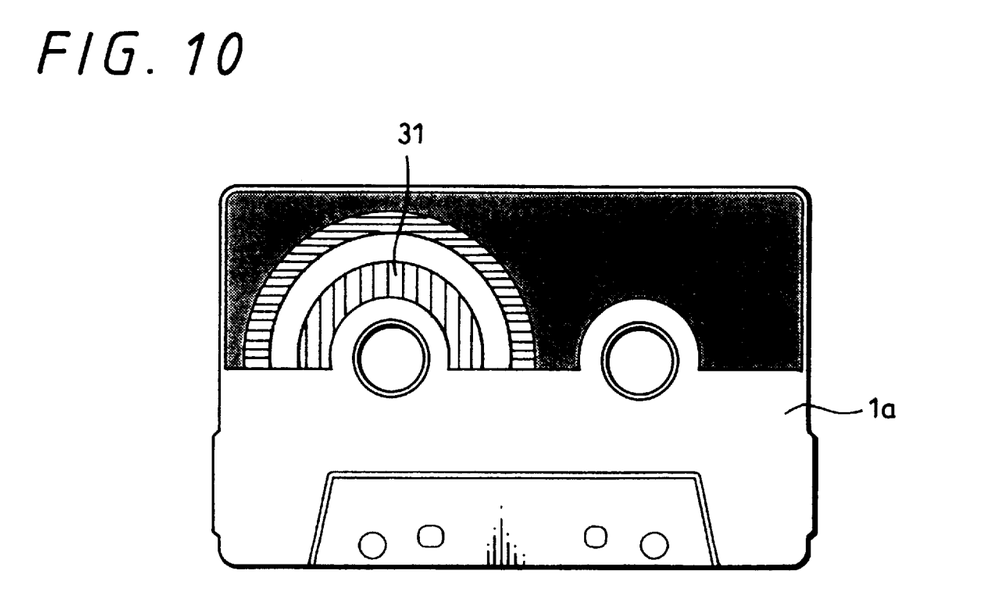
FIG. 10 is a diagram showing another modified example of the same scale display portion.

FIG. 9 and FIG. 10 show modified examples of the scale display portion 31, respectively. In the example of FIG. 9, the scale display in the scale display portion 31 is in a parallel line state, while the scale display portion 31 in FIG. 10 is, instead of the numerical value display of minute, such a display that color changes corresponding to the wound up diameter of the tape.

Thus far, the embodiments of the present invention have been explained, but the present invention is not restricted to them.

For example, in the above-mentioned embodiments, the thermal transfer printing is used as a printing method of the pattern on the cassette housing, but as for the printing method, multi-layer printing by a general printing method other than the thermal transfer printing may be employed.

Also, in the above-mentioned embodiment, as one example of the tape cassette, an audio compact cassette is shown, but the present invention is not restricted to this and needless to say, is capable of being widely applied to a tape cassette of other kinds having the remaining-volume display of the tape.

As apparent from the explanations made so far, since the tape cassette according to the present invention is of such a structure that the scale display portion which becomes a yardstick for the remaining volume of the tape is formed on the lowest layer of the pattern to be printed on the surface of the cassette housing, that is, as this scale display portion is protected by being covered with the upper layer of the pattern, at a time when the tape cassette is put in or pulled out from the car stereo or the like, even if the surface of the pattern of the cassette housing is attached with the scratches and the stain, the scale never becomes indiscernible and the function of displaying the remaining volume of the tape is never impaired. Further, because the printing of the pattern on the tape cassette can be carried out by the general printing method, it can be carried out easily and inexpensively.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A tape cassette comprising:

a pattern printed on a surface of a side of a transparent or semitransparent cassette housing;

wherein a scale display portion of said pattern is visible from a surface of an opposite side of the cassette housing, said pattern is printed on the cassette housing by way of thermal transfer printing, and a stripping layer which is an upper layer of said pattern works as a protection layer.

2. A tape cassette as claimed in claim 1, wherein said pattern comprises a stripping layer, a pattern layer and an adherent layer which are printed in turn in a superimposing fashion on one side surface of a base film.

3. A tape cassette as claimed in claim 2, wherein said base film can use a synthetic resin-made sheet such as polyethylene terephthalate or polypropylene.

4. A tape cassette as claimed in claim 1, wherein said scale display comprises a numerical display of minutes.

5. A tape cassette as claimed in claim 1, wherein said scale display comprises a series of parallel lines.

6. A tape cassette as claimed in claim 1, wherein said scale display comprises a changing color spectrum.

7. A tape cassette as claimed in claim 1, wherein said scale display is printed on each side of the cassette.

8. A tape cassette as claimed in claim 7, wherein said scale displays are not the same.

9. A method of printing a pattern onto tape cassette having a transparent housing, comprising:

pressing a thermal transfer film coated with an adherent layer onto the transparent cassette housing with a thermal transfer roller;

melting an adherent layer thus tightly adhering said layer to the transparent cassette housing, where said melting is performed by said thermal transfer roller;

pulling said thermal transfer film in a direction away from transparent cassette housing; thereby transferring a portion of a stripping layer and said adherent layer to the transparent cassette housing;

whereby a scale display portion of said pattern is visible from a surface of an opposite side of the transparent cassette housing.

* * * * *